United States Patent [19]
Takahashi et al.

[11] Patent Number: 5,323,381
[45] Date of Patent: Jun. 21, 1994

[54] DISC FOR RECORDING INFORMATION SIGNALS

[75] Inventors: Kenji Takahashi; Sachiya Chiba; Daiki Kobayashi, all of Miyagi, Japan

[73] Assignee: Sony Corporation, Tokyo, Japan

[21] Appl. No.: 904,159

[22] Filed: Jun. 25, 1992

[30] Foreign Application Priority Data

Jun. 29, 1991 [JP] Japan .................. 3-185132
Feb. 14, 1992 [JP] Japan .................. 4-059615
Feb. 14, 1992 [JP] Japan .................. 4-059616

[51] Int. Cl.$^5$ .......................... G11B 5/84; G11B 23/03
[52] U.S. Cl. .................. 369/282; 369/270; 369/290
[58] Field of Search ............. 369/282, 290, 271, 270

[56] References Cited

U.S. PATENT DOCUMENTS

| | | | |
|---|---|---|---|
| 4,787,009 | 11/1988 | Takahashi | 369/282 |
| 4,829,510 | 5/1989 | Takahashi | 369/271 |
| 4,926,410 | 5/1990 | Suzuki et al. | 369/271 |
| 4,941,066 | 7/1990 | Swinburn et al. | 369/282 |
| 4,944,982 | 7/1990 | Kikuchi | 369/282 |
| 4,983,439 | 1/1991 | Saito | 369/290 |
| 5,057,960 | 10/1991 | Shiba et al. | 369/270 |

FOREIGN PATENT DOCUMENTS

| | | | |
|---|---|---|---|
| 02330644 | 8/1987 | European Pat. Off. | G11B 7/24 |
| 0278358 | 8/1988 | European Pat. Off. | 369/290 |
| 0314010 | 5/1989 | European Pat. Off. | G11B 23/00 |
| 2624375A1 | 12/1977 | Fed. Rep. of Germany | G11B 3/62 |

OTHER PUBLICATIONS

Patent Abstracts of Japan vol. 12, No. 388 (P-771) (3235) 17 Oct. 1988 & JP-A-63 129 578 (Matsushita Electric Ind. Co. Ltd.) 1 Jun. 1988 *abstract*.

*Primary Examiner*—Richard A. Bertsch
*Assistant Examiner*—Peter Korytnyk
*Attorney, Agent, or Firm*—Philip M. Shaw, Jr.

[57] ABSTRACT

A disc for recording information signals includes a disc substrate of a synthetic resin having a center hole and an information signal recording layer formed on one major surface and a magnetic plate arranged on the major surface for closing the center hole. A recess for accommodating the magnetic plate is formed on the major surface of the disc substrate for surrounding the center hole. At least a part of the rim of the recess is thermally deformed for forming one or more lugs for holding the magnetic plate disposed in the recess with respect to the disc substrate by the lug(s).

23 Claims, 9 Drawing Sheets

DISC FOR RECORDING INFORMATION SIGNALS

BACKGROUND OF THE INVENTION

1) Field of the Invention

This invention relates to a disc for recording information signals, such as an optical disc or a magneto-optical disc. More particularly, it relates to a disc for recording information signals which is adapted to be chucked to a disc rotating driving device by taking advantage of a force of magnetic attraction.

2) Description of the Related Art

There has hitherto been proposed a disc for recording information signals for recording desired information signals, such as a write-once type optical disc or a magneto-optical disc.

This type of the disc which is of an extremely small diameter and permits of high density recording of information signals, is proposed. For example, a magneto-optical disc which has a diameter as small as 64 mm or less, is proposed.

The magneto-optical disc which is of a small diameter and permits of high density recording is loaded on a disc rotating and driving device and rotationally driven at a higher velocity. Whilst the disc is rotationally driven at an elevated velocity, a light beam is radiated from an optical disc onto fine recording tracks provided in a signal recording layer on a surface of the magneto-optical disc and an external magnetic field is impressed by a magnetic head onto the other surface of the magneto-optical disc for recording desired information signals.

For radiating the light beam on the fine recording tracks, the magneto-optical disc, rotationally driven at an elevated velocity, needs to be retained integrally with a disc table of the disc rotating and driving device as well as to be loaded with its center of rotation aligned high accurately with the axis of the disc table.

For accurately positioning and loading the magneto-optical disc on the disc table, a disc loading system is proposed in, for example, U.S. Pat. Nos. 4,926,410, 4,829,510 and 4,787,009, in which a metallic plate, provided on the magneto-optical disc, is attracted by a magnet provided on the disc table for chucking the magneto-optical disc on the disc table.

Referring to FIG. 1, a magneto-optical disc 100 employed in the disc chucking system taking advantage of the force of attraction by the magnet includes a disc substrate 101 molded from a transparent synthetic material, such as polycarbonate resin, into the shape of a disk. A recording layer for information signals is deposited by vapor deposition, sputtering etc. on a major surface 101a of the disc substrate 101. The other major surface 101b of the disc substrate 101, opposite to the major surface 101a on which the recording layer is deposited, is a write/read surface for information signals, and a light beam is radiated from the major surface 101b on the signal recording layer for recording/reproducing information signals.

The disc substrate 101 is formed with a center opening 102, as shown in FIG. 1, in which is engaged a centering member provided on the disc rotating and driving device. A ferrous metallic plate 103 is provided at the center of the major surface 101a of the disc substrate 101 for closing the center opening 102. The metallic plate 103 is mounted in a recess provided in the major surface 101a of the disc substrate 101 for encircling the center opening 102, and is secured therein with the aid of a double-sided adhesive tape or an adhesive 105.

With the magneto-optical disc 100 in which the metal plate 103 is mounted on the disc substrate 101 with the aid of the adhesive 105, there is a risk that the metal plate 103 be detached from the disc substrate 101 on repeated loading and unloading operations on or from the disc table of the disc rotating and driving device. That is, the force of magnetic attraction between the metal plate 103 and the magnet of the disc table at the time of loading and unloading with respect to the disc table acts as a load and is applied to the bonding area of the metal plate 103 to the disc substrate 101 to deteriorate the adhesive power of the adhesive 105.

For overcoming the inconvenience derived from the mounting of the metal plate with the aid of the adhesive, the present Assignee has proposed a magneto-optical disc in which the metal plate is mounted on the disc substrate without employing the adhesive.

Referring to FIG. 2, a magneto-optical disc 200 includes a disc substrate 201 formed of a transparent synthetic resin, such as a polycarbonate resin, and a recess 204 in one major surface 201a of the disc substrate 201 on which a recording layer for recording information signals is deposited. The recess 204 is formed around a center hole 202 and is adapted for receiving the metal plate 203 therein. A plurality of caulking projections 205 are formed at equiangular intervals on the circumference of the recess 204 for caulking the metal plate 203.

After the metal plate 203 is housed within the recess 204, heat or ultrasonic waves are impressed on the projections 205 for caulking these projections 205 towards the recess 204 as shown in FIG. 3 for supporting the metal plate 203 within the recess 204 by distal ends 205a of these caulked projections 205 for mounting the metal plate on the disc substrate 201.

With the magneto-optical disc 200 in which the metal plate 203 is supported and attached by the distal ends 205a of the projections 205 formed as one with the disc substrate 201, the metal plate 203 is fixedly supported by the disc substrate 201 so that the metal plate 203 remains attached to the disc substrate 201 even after repeated loading and unloading operations with respect to the disc table of the disc rotating and driving device.

However, for forming the disc substrate 201 with projections 205 for supporting the metal plate 203, a metal mold used for molding the disc substrate 201 becomes complex in structure to render the preparation of the metal mold difficult.

Besides, if the projections 205 are formed intermittently on the circumference of the recess 204, the molten synthetic resin becomes non-uniform in flow in those areas of the mold cavity which later form the projections 205. Besides, the molten synthetic resin tends to be cured with time lag to produce a so-called weld line to render it impossible to produce the uniformly cured disc substrate 201. Unless cured uniformly, the disc substrate 201 is deteriorated in optical properties due to residual inner stresses in the disc substrate 201. Above all, these residual inner stresses tend to produce double refraction in the disc substrate 201 to deteriorate information signal recording/reproducing characteristics when the disc substrate is used as a component of the magneto-optical disc 200.

For overcoming the inconveniences derived from intermittent projections for supporting the metal plate, it may be contemplated to provide a continuous annular projection on the circumference of the recess for accommodating the metal plate. However, this solution can hardly be realized because of difficulties met in uniformly caulking the continuous annular projection.

Although the continuous annular projection may be caulked only partially, the portion of the projection which has not been caulked remains in the projected state after having the metal plate supported with respect to the disc substrate. The result is that the disc substrate is increased in thickness by the residual portion of the projection so that the magneto-optical disc prepared using this disc substrate is also increased in thickness. On the other hand, difficulties are raised in designing the disc cartridge accommodating the magneto-optical disc because the disc cartridge needs to be of a constant thickness in order to be used interchangeably.

OBJECT AND SUMMARY OF THE INVENTION

It is therefore an object of the present invention to provide a recording disc for recording information signals whereby the metal mold used for molding the disc substrate may be prepared easily to permit facilitated preparation of the disc substrate.

It is another object of the present invention to provide a recording disc for recording information signals whereby the molded disc substrate may be prevented from being deteriorated in optical properties and may also be free from double refraction or the like defects.

The optical disc according to the present invention includes a disc substrate having a center opening and a recess in one major surface thereof. The recess has the center substantially coaxial with the center of the center hole. The optical disc also includes a metallic member placed in the recess in the disc substrate. The disc substrate has one or more lugs protruded from the major surface towards the inside of the recess for holding the metallic member with respect to the disc substrate.

Other objects and advantages of the present invention will become clear from the following description.

DETAILED DESCRIPTION OF THE PREFERRED EMBODIMENTS

Figure 1:
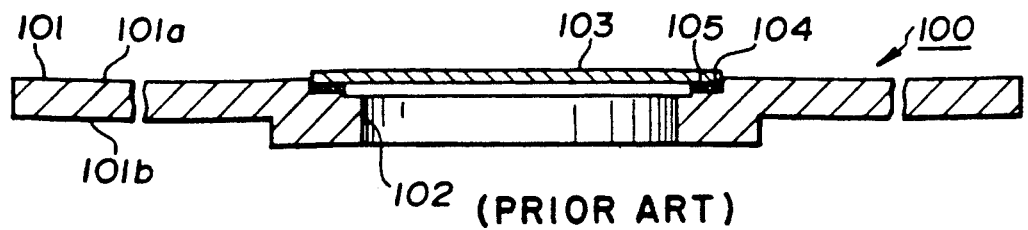
FIG. 1 is a cross-sectional view of a conventional magneto-optical disc.
Figure 2:
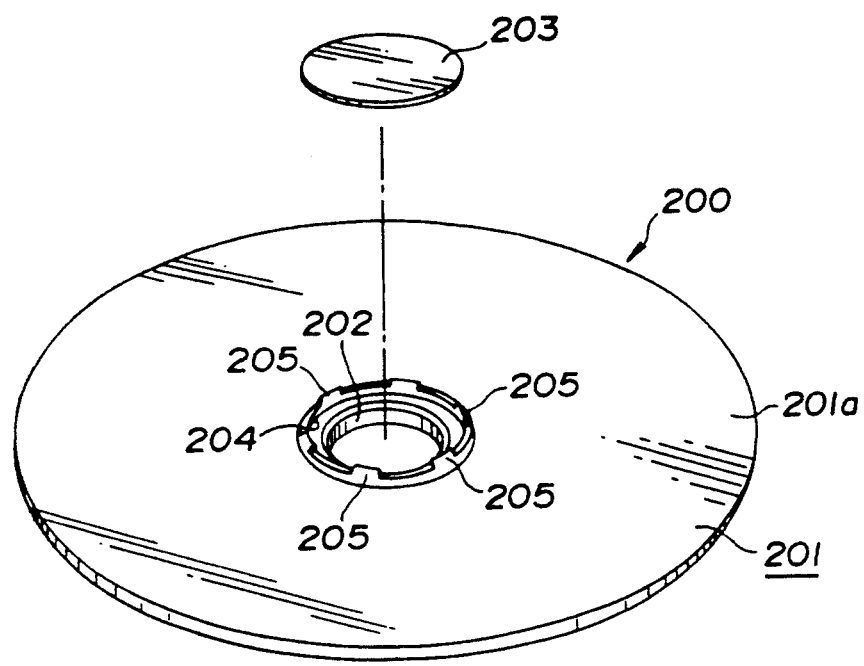
FIG. 2 is an exploded perspective view showing another conventional magneto-optical disc.
Figure 3:
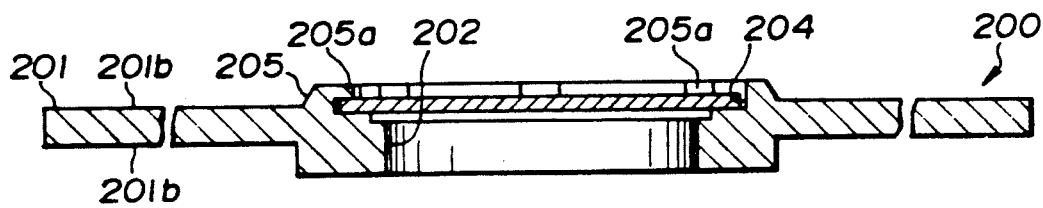
FIG. 3 is a cross-sectional view of a still another conventional magneto-optical disc.
Figure 4:
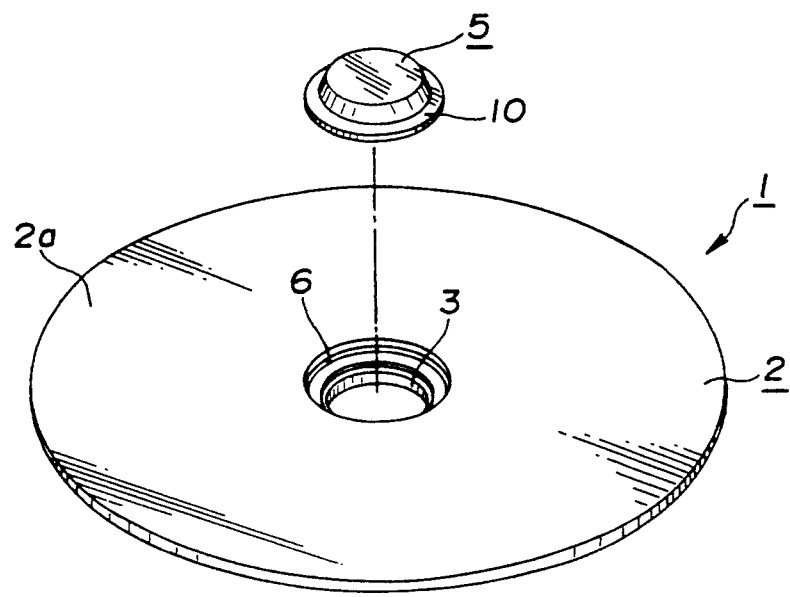
FIG. 4 is an exploded perspective view showing a magneto-optical disc according to a first embodiment of the present invention.
Figure 5:
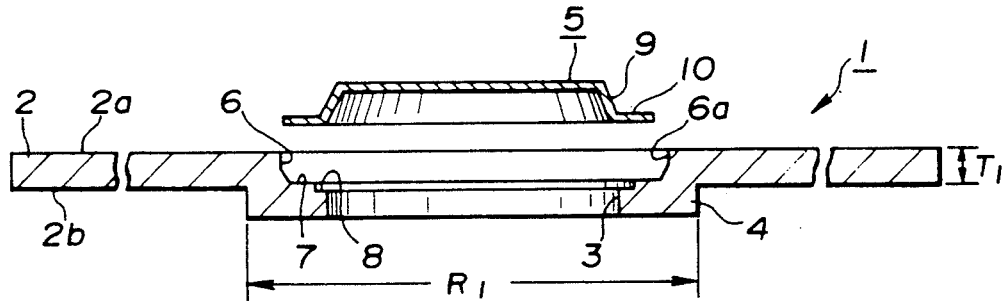
FIG. 5 is a cross-sectional view showing a disc substrate and a metal plate of the magneto-optical disc shown in FIG. 4.

Referring to the drawings, in particular FIGS. 4 and 5, preferred illustrative embodiments of the present invention will be explained in detail.

A magneto-optical disc 1 according to the present invention includes a disc substrate 2 formed of a synthetic resin, such as polycarbonate resin, in the shape of a disk. A signal recording layer for recording information signals is deposited on a major surface 2a of a disc substrate 2. The other major surface 2b of the disc substrate 2 opposite to the major surface 2a provided with the deposited signal recording layer is a signal write/- readout surface, and information signals may be recorded or reproduced by radiating a light beam on the signal recording layer from the side of the write/readout surface.

Meanwhile, the disc substrate 2 is of a thickness $T_1$ of the order of 1.2 mm.

The disc substrate 2 is formed with a center hole 3 engaged by a centering member provided centrally of a disc table of a rotating driving device provided within the recording/reproducing apparatus. The center hole 3 is bored through the disc substrate 2 so that its center is coincident with the center of curvature of a recording track(s) formed concentrically or spirally on the signal recording layer.

Referring to FIG. 5, an annular protuberance 4 is formed integrally at the center of the major surface 2b of the disc substrate 2 for encircling the center hole 3. The function of the protuberance 4 is to increase the depth of the center hole 3 in the thin disc substrate 2 to increase an amount of projection of the centering member provided on the disc table with respect to the center hole 3 for assuring a positive centering operation of loading the magneto-optical disc 1 with the center of rotation of the magneto-optical disc 1 coincident with the axis of the disc table.

The protuberance 4 is formed in at least a non-recording region towards the radially inner side of the disc substrate 2 free of the signal recording layer, and has an amount of axial projection substantially equal to the thickness T of the disc substrate 2. Thus the portion of the disc substrate 2 provided with the protuberance 4 has a thickness twice that of the main substrate body.

An annular recess 6 for accommodating a metallic plate 5 is formed around the center hole 3 on the major surface 2a of the disc substrate 2. The recess 6 has a diameter lesser than the outer diameter $R_1$ of the protuberance 4 and a depth substantially equal to the thickness T of the disc substrate 2. The recess 6 has a diameter larger at an opening end 6a than that at the bottom side to facilitate insertion of the metal plate 5 into the recess 6.

The bottom side of the recess 6, operating as a setting surface 7 for the metal plate 5, is formed with a step 8. The function of the step 8 is to prevent burrs or the like projections from being formed on the setting surface 7 for the metal plate 5 and to maintain planarity of the setting surface 7.

The metal plate 5, accommodated in the recess 6, is formed by punching a metal sheet, such as a stainless steel sheet, e.g. SUS-430, having a thickness on the order of 0.4 mm, into the shape of a disk.

Figure 6:
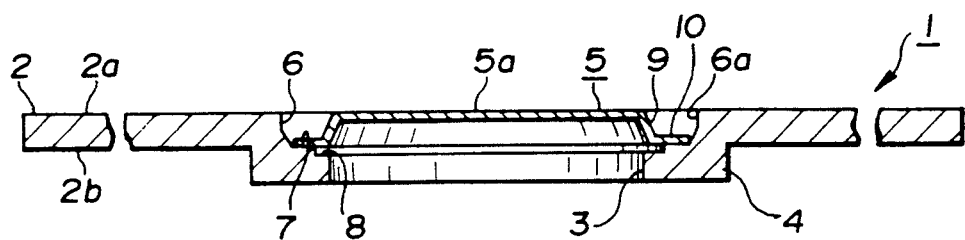
FIG. 6 is a cross-sectional view showing the metal plate accommodated in a recess formed in the disc substrate shown in FIG. 4.

Referring to FIG. 4, the metal plate 5 has the shape of a disk of a size that can be accommodated in the recess 6. Besides, the metal plate 5 has its outer peripheral part bent so that its central major part 5a is flush with the major surface 2a of the disc substrate 2 and an inner peripheral wall 6a of the recess 6 is faced by the rim of the metal plate 5, as shown in FIG. 6. That is, the outer rim part of the metal plate 5 is formed with a setting area 10 on the setting surface 7, which setting area is merged with the central major part 5a by means of a bent part 9. Thus the metal plate 5 is in the shape of a circular saucer, as shown in FIG. 4.

The above-described metal plate 5 is accommodated in the recess 6 with the setting area 10 set on the setting surface 7 of the recess 6, as shown in FIG. 6.

The rim part of the recess 6 is then thermally deformed at plural positions, such as at four points, for forming projections 11 projected into the interior of the recess 6. That is, these projections 11 are formed by crushing and deforming part of the rim of the recess 6 so that the deformed portions are projected into the inside of the recess 6. Therefore, no projections are formed on the major surface 2a of the disc substrate 2, except that recesses 12 are formed on the major surface 2a as a result of formation of the projections 11.

Figure 7:
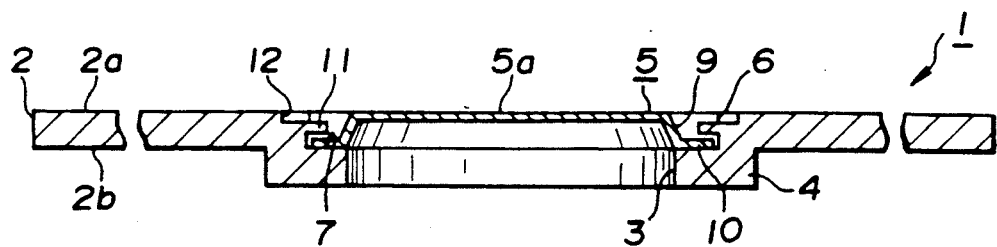
FIG. 7 is a cross-sectional view showing the metal plate attached to the disc substrate.
Figure 8:
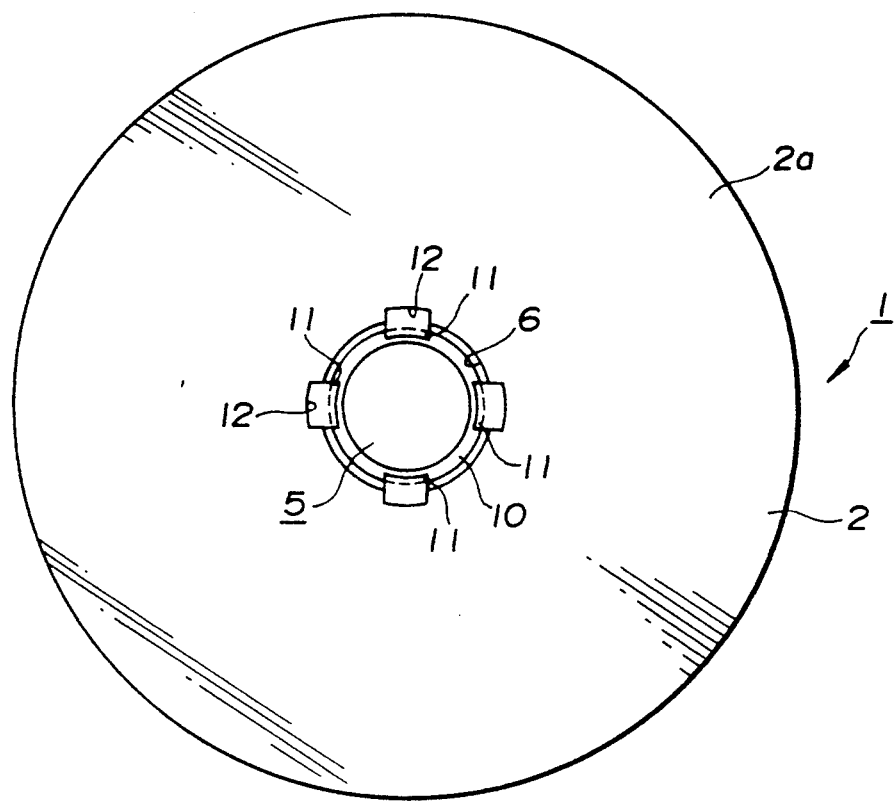
FIG. 8 is a plan view showing the surface of the magneto-optical disc for attachment of the metal plate according to a first embodiment of the present invention.

Since the projections 11 are formed in this manner, the metal plate 5 has its setting area 10 captured in the recess 6 by the projections 11, so that the metal plate 5 is fixed relative to the disc substrate 2 by being accommodated and supported within the recess 6, as shown in FIGS. 7 and 8. These projections 11 may be formed by thermal deformation because the rim part of the metal plate 5 is formed with the bent part faced by the inner periphery 6a of the recess 6, as shown in FIG. 6.

Although four such projections 11 are formed at equiangular intervals on the rim of the recess 6, as shown in FIG. 8, it is only necessary if the metal plate 5 is prevented from being dislocated from the inside of the recess 6 of the disc substrate 2, so that it suffices to provide two or more projections 11.

Alternatively, an annular projection may be formed on the entire circumference of the recess 6.

The projections 11 may be formed by applying a heated trowel or the like heating means to desired portions of the rim of the recess 6.

Figure 9:
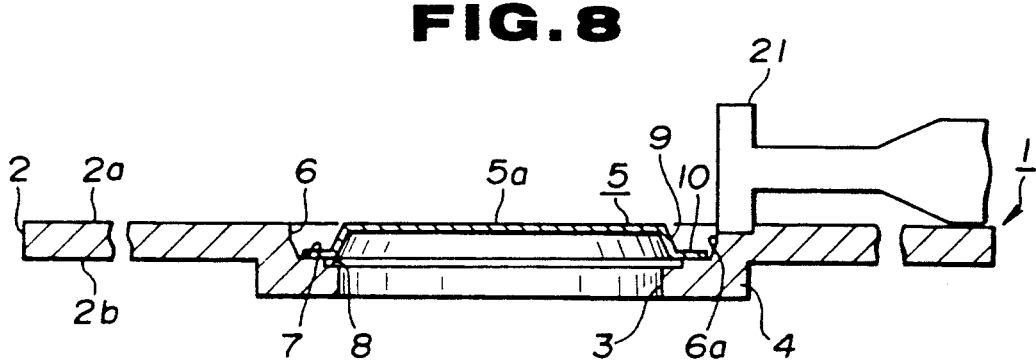
FIG. 9 is a schematic side view showing the state in which the metal plate is attached to the disc substrate using a swaging method.

A swaging method by ultrasonic waves may also be employed for forming the projections 11. For forming the projections 11 by the swaging method, a contactor 21 of an ultrasonic welding device is contacted with the rim of the recess 6 for thermally deforming the portions of the rim of the recess 6 contacted with the contactor 21 for causing these portions to be projected into the inside of the recess 6, as shown in FIG. 9.

Figure 10:
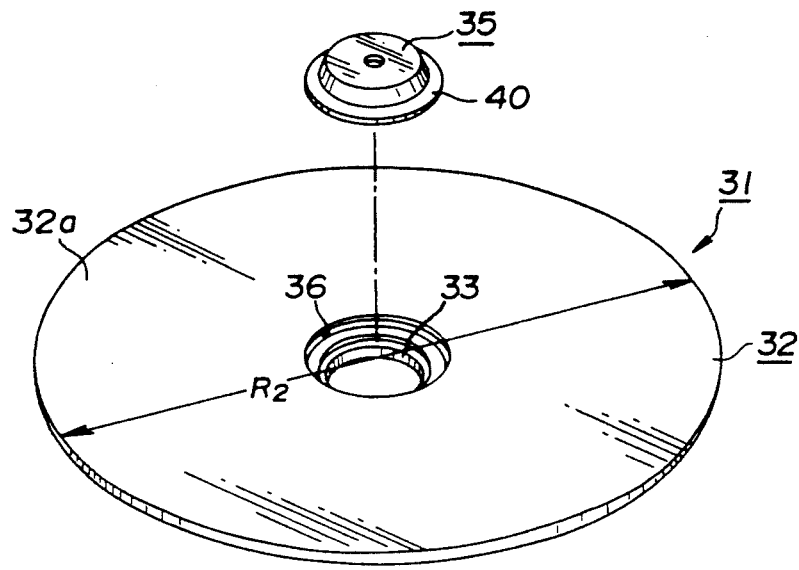
FIG. 10 is an exploded perspective view of a magneto-optical disc to which a method according to a second embodiment of the present invention is applied.
Figure 11:
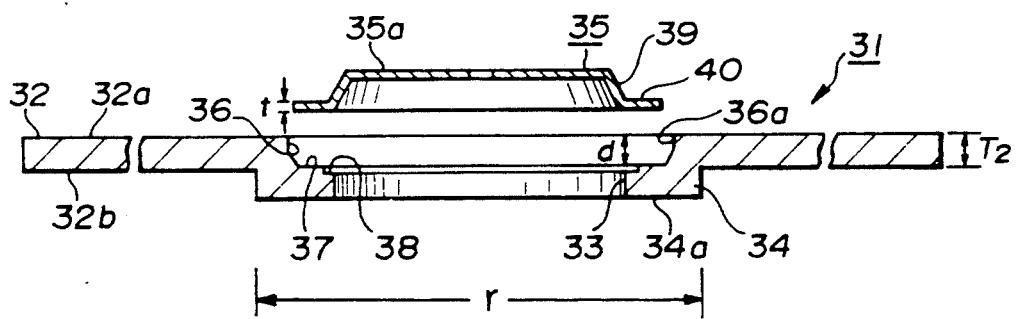
FIG. 11 is a cross-sectional view showing a disc substrate and a metal plate of the magneto-optical disc shown in FIG. 10.

Referring now to FIGS. 10, 11, a second embodiment of the present invention is hereinafter explained.

A magneto-optical disc 31, to which the method of the present invention is applied, includes a disc substrate 32 formed by molding a transparent synthetic resin material, such as polycarbonate resin, as shown in FIG. 10. The disc substrate is in the form of a disk having a radius $R_2$ equal to about 64 mm and a thickness $T_2$ equal to about 1.2 mm.

The magneto-optical disc 31, including the disc substrate 32, includes a signal recording part formed by depositing a signal recording layer on one major surface 32a of the disc substrate 32, with the opposite major surface 32b being a signal write/readout surface. A light beam is radiated on the signal recording layer from the write/read surface for recording/reproducing information signals.

Referring to FIGS. 10 and 11, a center hole 33, engaged by a centering member provided at the mid part of a disc table of a disc rotating and driving device provided within the recording/reproducing apparatus, is bored at the center of the disc substrate 32 of the magneto-optical disc 31. The center hole 33 is formed as a through-hole in the disc substrate 2 so that the center thereof is coincident with a recording track(s) formed concentrically or spirally on the signal recording layer.

Referring to FIG. 11, an annular protuberance 34 is formed at the center of the opposite major surface 32b of the disc substrate 32 for encircling the center hole 33. The function of the protuberance 34 is to increase the depth of the center hole 33 bored in the thin disc substrate 32 to increase an amount of projection of the centering member of the disc table in the center hole 33 to assure correct alignment of the center of rotation of the magneto-optical disc 31 with the axis of the disc table during loading of the magneto-optical disc 31 on the disc table. The end face of the protuberance 34 also functions as a loading reference plane with respect to the disc table.

Meanwhile, the protuberance 34 is formed in a non-recording radially inner region of the disc substrate 32 free of the signal recording layer, and has an amount of projection substantially equal to the thickness $T_2$ of the disc substrate 32. Thus the portion of the disc substrate 32 formed with the protuberance 34 has a thickness which is twice that of the main body of the disc substrate 32.

An annular recess 36 for accommodating a metallic plate 35 is formed around the center hole 33 on the major surface 32a of the disc substrate 32. The recess 36 has a diameter lesser than the outer diameter r of the protuberance 34 and a depth d substantially equal to the thickness $T_2$ of the disc substrate 32. The recess 36 has a diameter larger at an opening end 36a than that at the bottom side to facilitate insertion of the metal plate 35 into the recess 36.

The major surface 32a of the disc substrate 32 presents a planar surface except at the recess 36.

The bottom side of the recess 36, operating as a setting surface 37 for the metal plate 25, is formed with a step 38. The function of the step 38 is to prevent burrs or the like projections from being formed on the setting surface 37 for the metal plate 35 and to maintain planarity of the setting surface 37.

The metal plate 35, accommodated in the recess 36, is formed by punching a metal sheet, such as a stainless steel sheet, e.g. SUS-430, having a thickness on the order of 0.4 mm, into the shape of a disk, as shown in FIG. 10.

Referring to FIG. 10, the metal plate 35 has the shape of a disk of a size that can be accommodated in the recess 36. Besides, the metal plate 35 has its outer peripheral part bent so that its central major part 35a is flush with the major surface 32a of the disc substrate 32 and an inner peripheral wall 36a of the recess 36 is faced by the rim of the metal plate 35. That is, the outer rim part of the metal plate 35 is formed with a setting area 40 for the setting surface 37 which setting area is merged with the central major part 35a by means of a bent part 39. Thus the metal plate 5 is in the shape of a circular saucer, as shown in FIG. 10.

Referring now to FIGS. 12–17, inclusive, the metal plate 35, prepared as above, is retained with respect to the disc substrate 32 by the following process and method.

The disc substrate 32, formed as shown in FIGS. 10 and 11, is first set on a suction support table 51.

Figure 12:
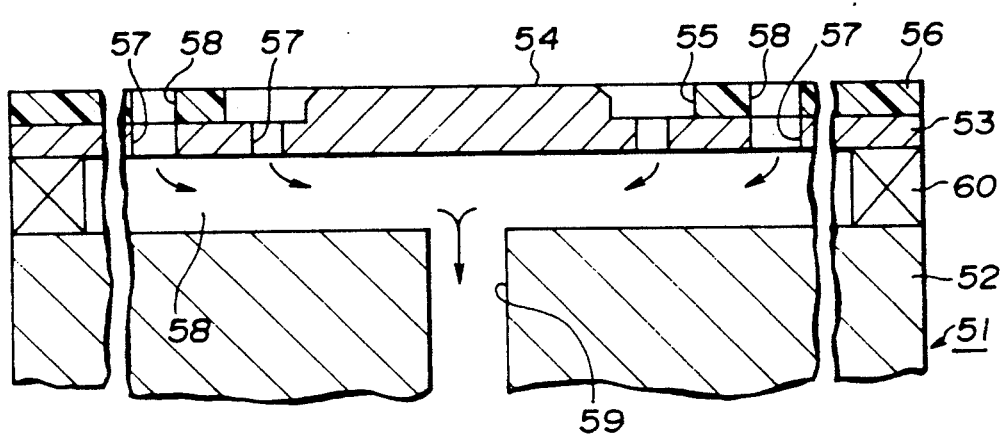
FIG. 12 is a schematic cross-sectional view showing a disc supporting table employed in the method employed in a second embodiment of the present invention.

The suction support table 51, adapted for positioning and supporting the disc substrate 32 set thereon by suction, is provided with a substrate supporting table 53 for positioning and setting the disc substrate 32 on the upper surface of a support table body 52, as shown in FIG. 12. The supporting table 53 has a central projection 54 engaged in the center hole 33 of the disc substrate 32 and a recess 55 around the projection 54 which recess is adapted for being engaged by the protuberance 34 of the disc substrate 32.

A soft protective sheet 56 of e.g. silicon rubber is bonded to a setting surface of the substrate supporting table 53 in contact with the major surface 32b of the disc substrate 32. The protective sheet 56 is provided for preventing damages to the major surface 32b of the disc substrate 32.

Suction means for supporting the disc substrate 32 set on the substrate supporting table 53 by suction under vacuum by a vacuum pump, not shown, is provided on the suction support table 51. The suction means includes a plurality of suction ports 57 formed in the substrate supporting table 53 and a plurality of spacers 60 interposed between the substrate supporting table 53 and the support table body 52 for defining a suction air chamber 58 so that air contained in the suction air chamber 58 is drawn by a vacuum pump, not shown, via an air passage 59 formed in the support table body 52, for sucking and supporting the disc substrate 32 with respect to the substrate support table 53.

The suction ports 57 are provided in the substrate support table 53 in register with outer peripheral region and the center region of the disc substrate 32 placed thereon and within the recess 55 engaged with the protuberance 34. By providing the suction ports at these positions, the disc substrate 32 may be pressed and supported substantially uniformly over its entire surface against the substrate support table 53.

Meanwhile, ports communicating with these suction ports 57 are formed in the protective sheet 56 in register with the suction ports 57.

Figure 13:
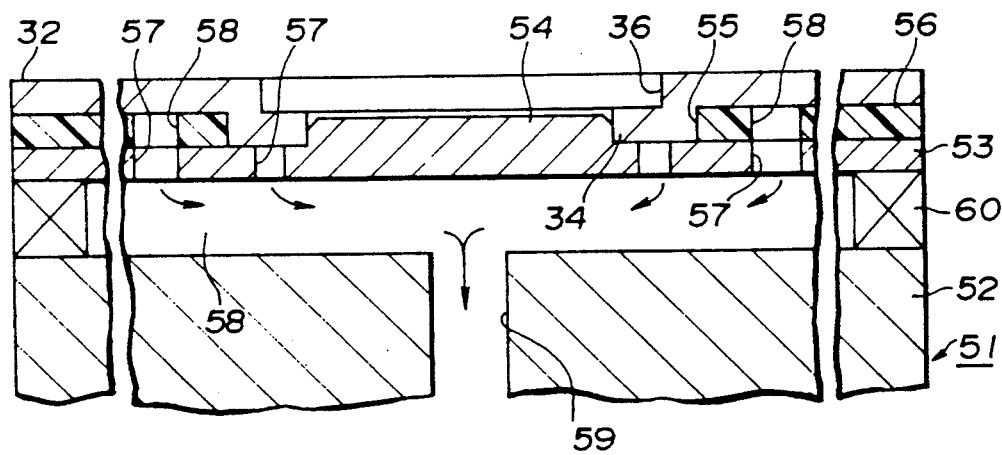
FIG. 13 is a cross-sectional view showing a disc substrate attached to the disc supporting table shown in FIG. 12.

Referring to FIG. 13, the disc substrate 32 is placed on the suction support table 51 so that the recess 36 for the metal plate 35 is directed upwards. At this time, the disc substrate 32 is loaded with the center hole engaged by the projection 54 and with the protuberance 34 engaged in the recess 55 so as to be positioned with respect to the suction support table 51.

With the disc substrate 32 thus set on the suction support table 51, the vacuum pump is set into operation for sucking the air contained in the suction chamber 59 via the air passage 58. At this time, the air contained between the disc substrate 32 and the suction support table 51 is sucked via the suction ports 57 for tightly supporting the disc substrate 32 against the protective sheet 56 on the suction support table 51.

Since the disc substrate 32 is supported at this time on the suction support table 56 with the center hole 33 being engaged by the projection 54 and with the protuberance 34 engaged in the recess 55, the disc substrate 32 is loaded in position on the suction support table 56.

Figure 14:
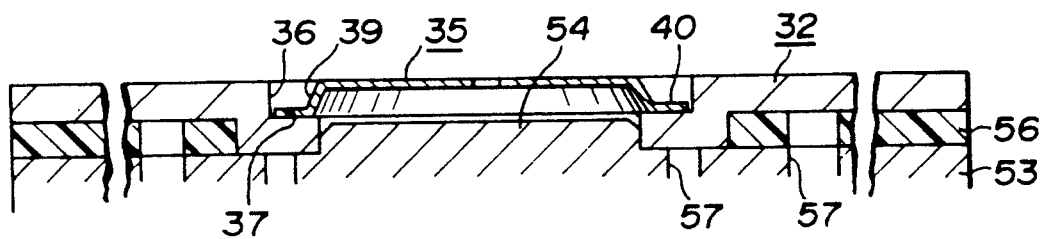
FIG. 14 is a cross-sectional view showing the metal plate accommodated in a recess formed in the disc substrate to which the method according to the second embodiment of the present invention is applied.

After the disc substrate 32 is loaded in this manner on the suction support table 51, the metal plate 35 is accommodated in the recess 36. At this time, the metal plate 35 is accommodated in the recess 36 with the setting area 40 thereof set on the setting surface 37 of the recess 36, as shown in FIG. 14.

Figure 15:
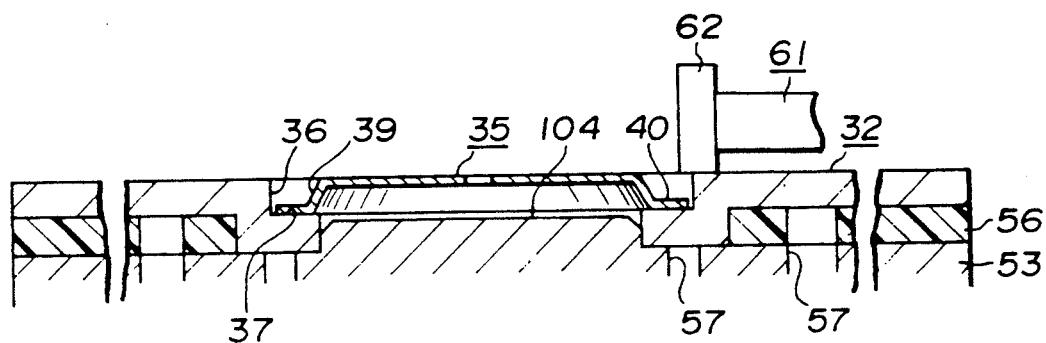
FIG. 15 is a cross-sectional view showing the state in which a vibrator of an ultrasonic application device is contacted with the rim of a recess of a disc substrate for accommodating a magnetic plate.

After the metal plate 35 is placed within the recess 36, a vibrator 62 as a resonator of an ultrasonic wave application device 61 has its tip contacted with the rim of the recess 36 for impressing ultrasonic waves having a plane of oscillation in a direction parallel to the major surface of the disc substrate 32, as shown in FIG. 15. It is noted that, during application of the ultrasonic oscillations to the disc substrate 32, the ultrasonic vibrator 62 is pressed with a predetermined pressure against the disc substrate 32.

Figure 16:
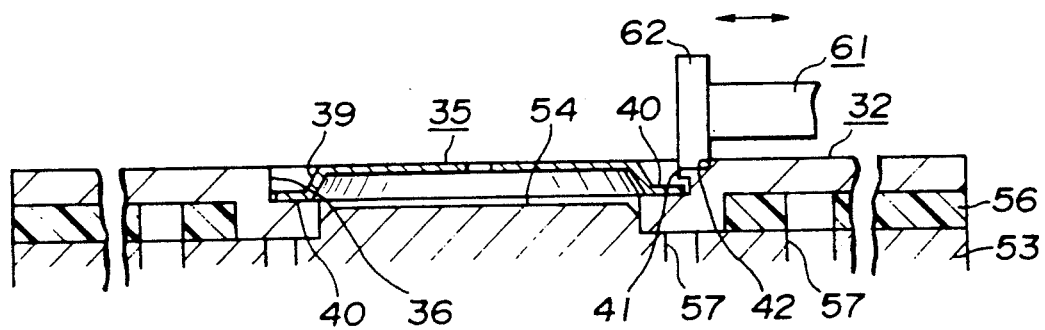
FIG. 16 is a cross-sectional view showing the state in which a projection is formed on the rim of the recess in the disc substrate for accommodating the metallic plate by application of ultrasonic vibrations.

When the ultrasonic vibrations are applied in this manner, the rim part of the recess 36 contacted with the vibrator 62 is heated and softened. Since the vibrator 62 is pressed with the predetermined pressure from above, a recessed area 42 corresponding in size to the vibrator 62 is formed around the rim of the recess 36 and correspondingly a lug 41 is formed for being projected towards the inner region of the recess 36. As shown in FIG. 16, this lug 41 is protruded above the setting area 40 of the metal plate 35 placed in the recess 36 for capturing the setting area 40 within the recess 46.

Meanwhile, since the ultrasonic vibrations are applied to the disc substrate 32 in a direction parallel to the major surface 32a of the disc substrate 32, the ultrasonic vibrations are transmitted in a direction parallel to the major surface 32a of the disc substrate 32, so that the portions of the disc substrate 32 softened by being contacted with the vibrator of the disc substrate 32 is displaced in a direction parallel to the major surface 32a along which the ultrasonic vibrations are transmitted. The result is that the lug 41 formed on the rim of the recess 36 is protruded positively towards the inner region of the recess 36 for overlying the setting area 40 of the metal plate 35.

Figure 17:
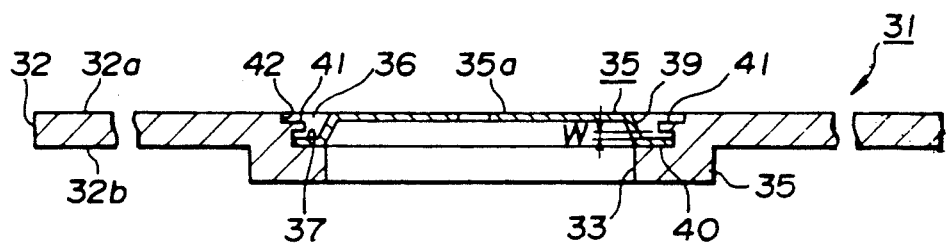
FIG. 17 is a cross-sectional view showing the state in which the metallic metal plate is attached to the disc substrate.

According to the method of the present invention according to a second embodiment, the ultrasonic vibrations applied to the disc substrate 32 are produced in a direction parallel to the major surface 32a of the disc substrate 32, so that only little vibrations are transmitted along the thickness of the disc substrate 32. The result is that heating of the disc substrate in a direction along its thickness is limited to inhibit deformation of the recess 36 in the same direction. In this manner, the lug 41 extended towards the inner region of the recess 36 may have a controlled thickness to enable the lug 41 to support the setting area 40 of the metal plate 35 without being contacted with the setting area 40. That is, by setting the depth d of the recess 36 so as to be larger than the thickness of the metal plate 35, a gap w may be provided between the lug 41 and the setting area 40, as shown in FIG. 17, for loosely accommodating and holding the metal plate 35 within the recess 36.

By loosely fitting and supporting the metal plate 35 in the recess 36 in this manner, it becomes possible to prevent the metal plate 35 from being fixed with a tilt relative to the major surface of the disc substrate 32 as well as to prevent the disc substrate 35 of synthetic resin from being deformed due to difference in thermal expansion coefficient between the metal plate 35 and the disc substrate 32.

By providing the lugs 41, formed by applying ultrasonic vibrations in a direction parallel to the major surface 32a of the disc substrate 32, at plural positions, such as four positions, symmetrically on the rim of the recess 36, the metal plate 35 accommodated within the recess 36 may be supported by the lugs 41 and thereby retained by the disc substrate 2.

By simultaneously contacting the oscillator 62 on the rim of the recess 36 simultaneously, plural lugs 41 may be formed at the same time.

It is noted that the size of the oscillator 62 contacted with the rim of the recess 36 for forming the lug 41 is set by the desired size of the lug 4.

Meanwhile, the ultrasonic vibrations to be applied to the disc substrate 32 of a polycarbonate resin, to which the present invention is applied, is set within the range of 15 to 50 kHz. If the oscillation frequency is not more than 15 kHz, sufficient heating may not be achieved, whereas, if the oscillation frequency is 50 kHz or higher, the degree of softening of the portions of the disc substrate to be contacted with the oscillator 62 and thereby softened is difficult to control because of excessive heating. The ultrasonic vibrations are preferably on the order of 20 kHz.

Figure 18:
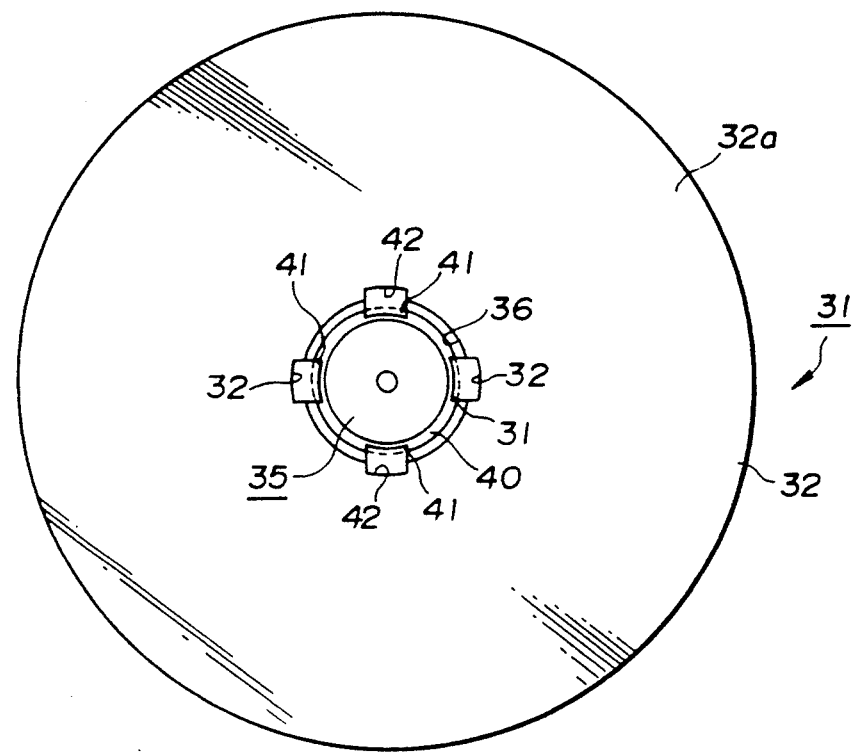
FIG. 18 is a plan view showing a magneto-optical disc to which the metallic metal plate is attached by the method according to the second embodiment of the present invention.

Although four of the lugs 41 are formed symmetrically at equiangular intervals on the rim of the recess 36 in the present embodiment, as shown in FIG. 18, it is only necessary that the metal plate 35 be supported by the disc substrate 31 without being detached from the recess 36, so that it suffices to provide two or more lugs at appropriate positions on the rim of the recess 36.

Besides, the metal plate 35 held by the disc substrate 32 may be in the form of a flat disc of a size to be accommodated within the recess 36, instead of being bent so as to have the setting area 40 as in the present embodiment.

Referring now to FIGS. 19-24, inclusive, a third embodiment of the present embodiment will be hereinafter explained. It is noted that parts or components similar to those of the preceding embodiments are denoted by the same reference numerals and detailed description therefor is omitted for simplicity.

Figure 19:
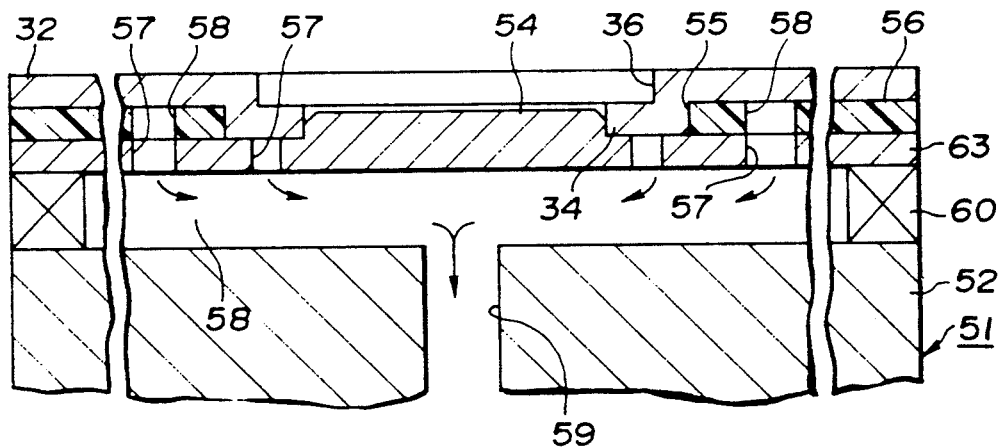
FIG. 19 is a cross-sectional view showing the state in which a disc substrate is loaded on a disc supporting table employed in a method according to a third embodiment of the present invention.
Figure 20:
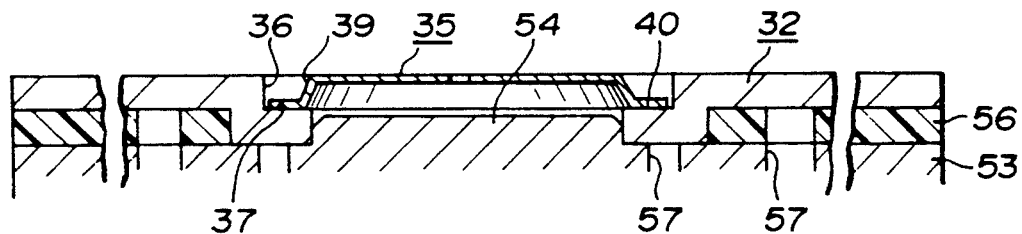
FIG. 20 is a cross-sectional view showing the state in which the metal plate is accommodated in the recess in the disc substrate to which the method according to the third embodiment of the present invention is applied.

After loading the disc substrate 32 on the suction support table 51, as shown in FIG. 19, the metal plate 35 is placed within the recess 36. At this time, the metal plate 35 is placed in the recess 3 with the setting area 40 thereof resting on the setting surface 37 of the recess 36, as shown in FIG. 20.

Figure 21:
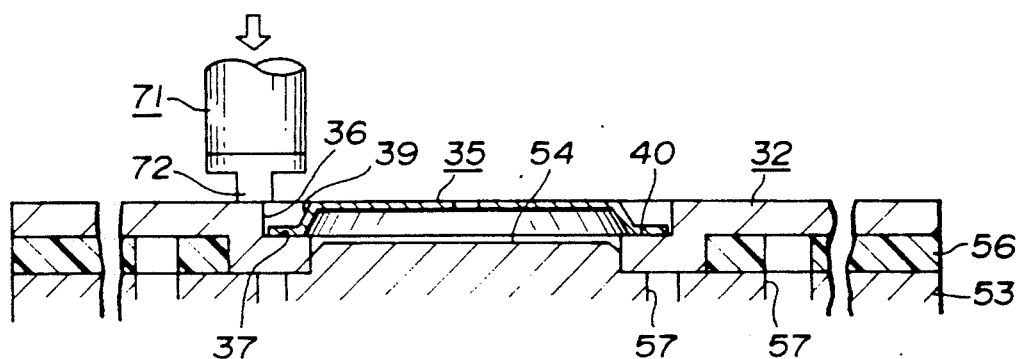
FIG. 21 is a cross-sectional view showing the state in which a vibrator of an ultrasonic application device is contacted with the rim of a recess of a disc substrate for accommodating a magnetic plate.

After the metal plate 35 is placed within the recess 36, an oscillator 72, operating as a resonator of the ultrasonic vibrator 71, has its tip contacted with the rim of the recess 36, as shown in FIG. 21, and ultrasonic vibrations are applied in a direction perpendicular to the major surface of the disc substrate 32. It is noted that, when the ultrasonic vibrations are applied to the disc substrate 32, the oscillator 73 is pressed against the disc substrate 32 with a certain pressure.

Figure 22:
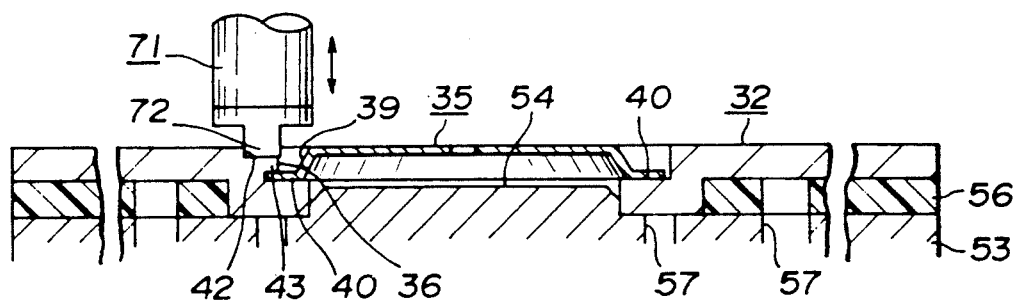
FIG. 22 is a cross-sectional view showing the state in which a projection is formed on the rim of the recess in the disc substrate for accommodating the metallic plate by application of ultrasonic vibrations.
Figure 23:
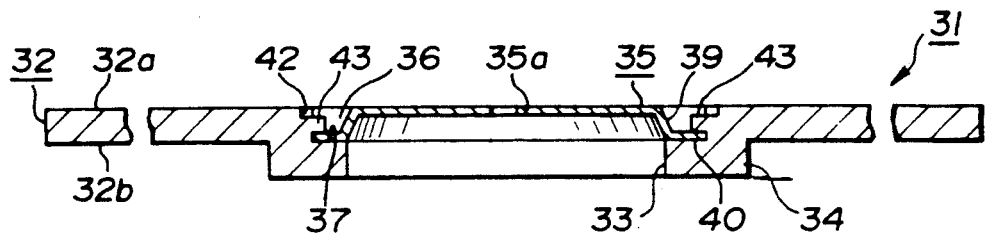
FIG. 23 is a cross-sectional view showing the state in which the metallic plate is attached to the disc substrate.

By application of the ultrasonic vibrations in this manner, the rim portions of the recess 36 contacted by the oscillator 72 are heated and softened. Since the oscillator 72 is pressed at this time with a predetermined pressure, a recessed area 42 of a size corresponding to that of the oscillator 72 is formed in the rim part of the recess 36, and correspondingly, a lug 43 is formed for being projected into the inside of the recess 36. As shown in FIG. 22, the lug 43 is protruded above the setting area 40 of the metal plate 35 for supporting the setting area 40.

Since the ultrasonic vibrations applied to the disc substrate 32 are produced in a direction perpendicular to the major surface of the disc substrate 32, the vibrations are propagated in a direction along the thickness of the disc substrate 32. Conversely, only little vibrations are propagated in a direction along the major surface 32a of the disc substrate 32. The result is that the disc substrate 32 is softened mainly in the direction along the depth of the portions thereof contacted with the oscillator 72, while softening thereof in the direction along the major surface 32a is restricted. In this manner, the lug 43 may be formed with a size corresponding to the size of the vibrator 72.

By providing lugs 43, formed by applying ultrasonic vibrations in a direction perpendicular to the major surface 32a of the disc substrate 32, at plural positions, such as four positions, symmetrically on the rim of the recess 36, the metal plate 35 accommodated within the recess 36 may be supported by the lugs 43 and thereby retained by the disc substrate 32.

It is noted that the size of the oscillator 72 contacted with the rim of the recess 36 for forming the lugs 43 is set by the desired size of the lug 4.

Meanwhile, the ultrasonic vibrations to be applied to the disc substrate 32 of a polycarbonate resin, to which the present invention is applied, is set within the range of 15 to 40 kHz. If the oscillation frequency is not more than 15 kHz, sufficient heating may not be achieved, whereas, if the oscillation frequency is 40 kHz or higher, the degree of softening of the portions of the disc substrate to be contacted with the oscillator 72 and thereby softened is difficult to control because of excessive heating. The ultrasonic vibrations are preferably on the order of 20 kHz.

Figure 24:
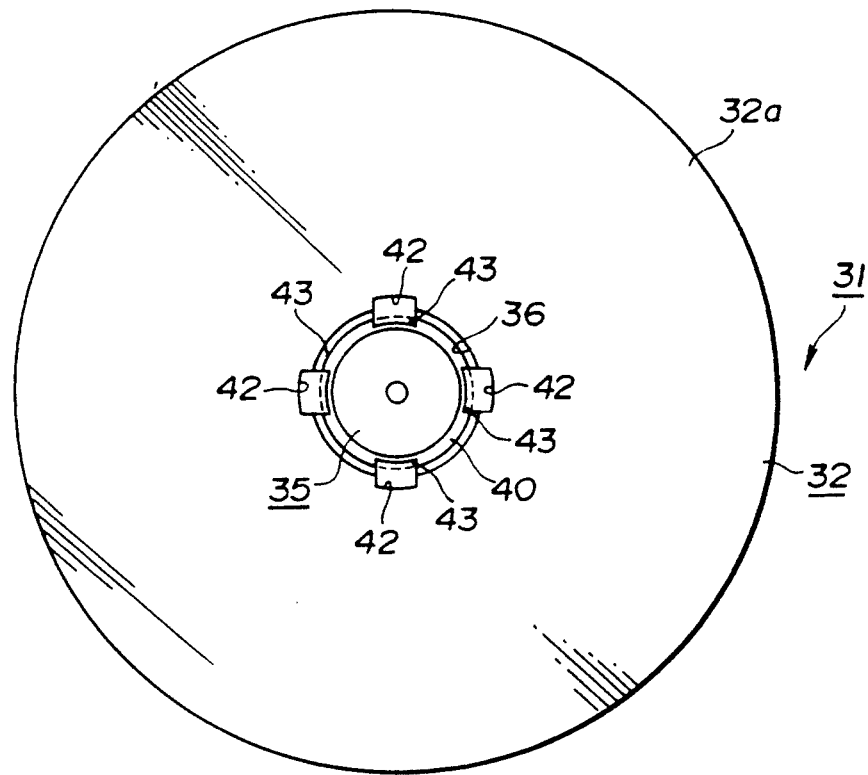
FIG. 24 is a plan view showing a magneto-optical disc to which the metallic plate is attached by the method according to the third embodiment of the present invention.

Although four of the lugs 41 are formed symmetrically at equiangular intervals on the rim of the recess 36 in the present embodiment, as shown in FIG. 24, it is only necessary that the metal plate 35 be supported by the disc substrate 31 without being detached from the recess 36, so that it suffices to provide two or more lugs at appropriate positions on the rim of the recess 36.

A sole annular lug 43 may also be provided on the entire circumference of the recess 36, in which case the oscillator 72 is in the form of a ring corresponding to the rim of the recess 36.

Besides, the metal plate 35 held by the disc substrate 32 may be in the form of a flat disc of a size to be accommodated within the recess 36, instead of being bent so as to have the setting area 40 as in the present embodiment.

In addition, although the disc is the magneto-optical disc in the above-described embodiments, the present invention may be extensively applied to a disc for recording information signals which is provided with a disc substrate of synthetic resin and a metallic plate for magnetically chucking the disc.

What is claimed is:

1. An optical disc comprising a disc substrate having a center hole and a recess in one major surface thereof, the recess having a radial center substantially coaxial with the center of the center hole, and a metal member placed in the recess in the disc substrate to cover the center hole, the disc substrate having one or more lugs protruded radially inward from the major surface towards the inside of the recess and over an outer rim of the metal member to capture the metal member within the recess.

2. An optical disc as claimed in claim 1 wherein the recess is formed with a step connecting to the major surface of the disc substrate.

3. An optical disc comprising:

a disc substrate having a protuberance on one major surface thereof for surrounding a center hole and a recess on the opposite major surface thereof having a center substantially coaxial with a radial center of the center hole, and a metal member placed in the recess in the disc substrate, the disc substrate having one or more lugs radially protruded from the major surface towards the radial center of the recess over an outer rim of the metal member to thereby capture the metal member within the recess.

4. An optical disc as claimed in claim 3 wherein the recess is formed with a step connecting to the major surface of the disc substrate.

5. An optical disc comprising:

a disc substrate having a protuberance on one major surface thereof for surrounding a center hole and a recess on an opposite major surface thereof having a radial center substantially coaxial with the center of the center hole, and a metal member in the recess and having a central planar area which covers the center hole and a setting area on the outer periphery of the planar area, the setting area being parallel to the planar area and connected thereto by an upstanding wall section, the disc substrate having one or more lugs radially protruded from the opposite major surface towards the radial center of the recess for overlying a part of the setting area.

6. An optical disc as claimed in claim 5 wherein the recess is formed with a step connecting to the opposite major surface of the disc substrate.

7. A method for holding a metal member by a disc substrate exhibiting light transmitting properties and having a center hole and a recess in one major surface thereof the recess having a radial center substantially coaxial with a radial center of the center hole, the method comprising the steps of:

placing the metal member in the recess of the disc substrate, and applying, with the metal member placed in the recess, ultrasonic vibrations to a rim part of the recess of the disc substrate by ultrasonic wave generating means, while the ultrasonic wave generating means is pressed against the disc substrate, for thermally deforming the rim part of the recess of the disc substrate to extend from the one major surface into the recess and over an outer edge of the metal member for holding the metal member in the recess of the disc substrate.

8. A method as claimed in claim 7 wherein the step of applying ultrasonic vibrations comprises applying vibrations having a plane of vibration in a direction parallel to the one major surface of the disc substrate.

9. A method as claimed in claim 7 wherein the step of applying ultrasonic vibrations comprises applying vibrations having a plane of vibrations in a direction perpendicular to the one major surface of the disc substrate.

10. A method as claimed in claim 7 wherein the step of applying ultrasonic vibrations comprises applying ultrasonic vibrations in the range of from 15 to 50 kHz.

11. A method for holding a metal member by a disc substrate exhibiting light transmitting properties and having a center hole and a recess in one major surface thereof, the recess having a radial center substantially coaxial with the center of the center hole, the method comprising the steps of:

holding the disc substrate in a positioned state, and applying ultrasonic vibrations to portions of a rim part of the recess of the disc substrate while the metal member is placed in the recess of the disc substrate to deform the portions of the rim part to extend radially inwardly into the recess and over an outer rim of the metal member and thereby capture the metal member within the recess.

12. A method as claimed in claim 11 wherein the ultrasonic vibrations are applied in a plane in a direction parallel to the major surfaces of the disc substrate.

13. A method as claimed in claim 11 wherein the ultrasonic vibrations are applied in a plane in a direction perpendicular to the major surfaces of the disc substrate.

14. A method as claimed in claim 11 wherein the ultrasonic vibrations are in the range of from 15 to 50 kHz.

15. An optical disc comprising:
   a disc substrate having a center opening and a recess in one major surface thereof, the recess having a radial center substantially coaxial with the center of the center opening, and
   a metal member placed in the recess in the disc substrate,
   the disc substrate having one or more lugs protruded radially inwardly from the major surface towards the inside of the recess so as to extend over an outer rim part of the metal member,
   wherein the distance between a bottom of the recess and the lug is selected to be larger than the thickness of the outer rim part of the metal member.

16. An optical disc as claimed in claim 15 wherein the metal member is in the form of a disc of a diameter less than the inner diameter of the recess.

17. An optical disc comprising
   a disc substrate having a protuberance on one major surface thereof for surrounding a center hole and a recess on the opposite major surface thereof having a radial center substantially coaxial with the center of the center hole, and
   a metal member placed in the recess in the disc substrate,
   the disc substrate having one or more lugs protruded radially inwardly from the major surface towards the inside of the recess so as to extend over an outer rim part of the metal member,
   wherein the distance between a bottom of the recess and the lug is selected to be larger than the thickness of the outer rim part of the metal member.

18. An optical disc as claimed in claim 17 wherein the metal member is in the form of a disc of a diameter less than the inner diameter of the recess.

19. An optical disc comprising
   a disc substrate having a protuberance on one major surface thereof for surrounding a center hole and a recess on the opposite major surface thereof having a radial center substantially coaxial with the center of the center hole, and
   a metal member which includes a central planar area and a setting area on an outer periphery of the planar area, the setting area being parallel to the planar area and connected thereto by an upstanding wall section, the metal member being placed within the recess,
   the disc substrate having one or more lugs protruded radially inwardly from the opposite major surface towards the inside of the recess for overlying a part of the setting area,
   wherein the distance between a bottom of the recess and the lug is selected to be larger than the thickness of the outer rim part of the metal member.

20. An optical disc as claimed in claim 19 wherein the metal member is in the form of a disc of a diameter less than the inner diameter of the recess.

21. An optical disc comprising:
   a disc substrate having a center hole and a recess in one major surface thereof, the recess having a radial center substantially coaxial with the center of the center hole and a rim which is coplanar with the one major surface, and
   a metal member placed in the recess in the disc substrate, the metal member having no part which protrudes out of the recess above the rim and further having a radially outer edge which is positioned below the rim, and
   wherein the disc substrate has one or more lugs in the form of a deformed portion of the rim which protrudes radially inwardly from the rim so as to extend over the outer edge of the metal member without extending out of the recess.

22. An optical disc according to claim 21, further comprising:
   an annular protuberance on another major surface of the disc substrate, which is opposite the one major surface, for coaxially surrounding the center hole and the recess on the opposite major surface, the annular protuberance increasing the thickness of the disc substrate in order to accommodate the recess.

23. An optical disc according to claim 21, wherein the metal member comprises:
   a central planar area and a setting area on the rim, the setting area being parallel to the planar area and connected thereto by an upstanding wall section.

* * * * *